(12) United States Patent
Lee

(10) Patent No.: US 10,174,741 B2
(45) Date of Patent: Jan. 8, 2019

(54) BLADE PITCH CONTROL APPARATUS FOR SMALL SIZE WIND POWER GENERATOR

(71) Applicant: GU CO., LTD., Gyeonggi-do (KR)

(72) Inventor: Jong Rai Lee, Gyeonggi-do (KR)

(73) Assignee: GU CO., LTD., Hwaseong-si, Gyeonggi-do (KR)

(*) Notice: Subject to any disclaimer, the term of this patent is extended or adjusted under 35 U.S.C. 154(b) by 459 days.

(21) Appl. No.: 15/007,220

(22) Filed: Jan. 27, 2016

(65) Prior Publication Data
US 2017/0114774 A1    Apr. 27, 2017

(30) Foreign Application Priority Data
Oct. 22, 2015    (KR) .................... 10-2015-0147140

(51) Int. Cl.
*F03D 7/02* (2006.01)
*F03D 7/04* (2006.01)

(52) U.S. Cl.
CPC ........... *F03D 7/0236* (2013.01); *F03D 7/042* (2013.01); *F05B 2240/2022* (2013.01); *F05B 2240/221* (2013.01); *F05B 2260/77* (2013.01); *F05B 2270/1011* (2013.01); *F05B 2270/327* (2013.01); *Y02E 10/723* (2013.01)

(58) Field of Classification Search
CPC ..... F03D 7/0236; F03D 7/042; Y02E 10/723; F05B 2260/77; F05B 2240/2022;
(Continued)

(56) References Cited

U.S. PATENT DOCUMENTS

| 13,156 | A | * | 7/1855 | Brown | ................... B64C 11/343 |
| | | | | | 416/89 |
| 124,499 | A | * | 3/1872 | Mabie | ..................... F16H 21/36 |
| | | | | | 74/49 |

(Continued)

FOREIGN PATENT DOCUMENTS

| KR | 10-1043430 B1 | 6/2011 |
| KR | 10-1110908 B1 | 3/2012 |

*Primary Examiner* — Dwayne J White
*Assistant Examiner* — Adam W Brown
(74) *Attorney, Agent, or Firm* — Revolution IP, PLLC

(57) ABSTRACT

The present invention relates to a blade pitch control apparatus for a small size wind power generator. More specifically, the present invention relates to a blade pitch control apparatus for a small size wind power generator configured to accomplish continuous generation by continuously maintaining the necessary rotating force of the blade by systematically operating the ball screw, spinner driver, and pitch angle controller when the rotation number of blades exceeds the reference rotation number by over wind speed, so that the blade pitch is automatically controlled. To this end, the present invention comprises a blade combined with an outer circumference surface of a rotator, rotating by wind; a spinner box installed and fixed in the middle of the front surface of the blade; a ball screw formed with speed control wings at one end in a state positioned in the longitudinal direction in the middle of the spinner box and having screws at the other end; a spinner driver screw-combined with the screw of the ball screw, and moving to the front and back when the rotation number of blades exceeds the reference rotation number by over wind speed or when the wind speed decreases; and a pitch angle controller connected between the spinner driver and blade, folding and unfolding the blade according to the movement direction of the spinner driver to control the pitch angle of the blade.

4 Claims, 3 Drawing Sheets

(58) Field of Classification Search
CPC ........ F05B 2240/221; F05B 2270/1011; F05B 2270/327
See application file for complete search history.

(56) References Cited

U.S. PATENT DOCUMENTS

| | | | | |
|---|---|---|---|---|
| 147,188 A * | 2/1874 | Spicer | F03D 80/00 | 416/41 |
| 2,094,941 A * | 10/1937 | Burkhartsmeier | F03D 7/0224 | 416/132 B |
| 2,516,576 A * | 7/1950 | Jacobs | F03D 7/0236 | 416/132 B |
| 2,655,604 A * | 10/1953 | Hutter | F03D 7/0224 | 290/55 |
| 2,832,895 A * | 4/1958 | Hutter | F03D 7/0224 | 290/44 |
| 4,084,921 A * | 4/1978 | Norz | F03D 7/0204 | 416/114 |
| 4,183,715 A * | 1/1980 | Ducker | F03D 7/0224 | 416/104 |
| 4,201,514 A * | 5/1980 | Huetter | F03D 1/0658 | 416/102 |
| 4,257,740 A * | 3/1981 | Duez | F03D 7/0224 | 416/137 |
| 4,310,284 A * | 1/1982 | Randolph | F03D 7/0224 | 416/11 |
| 4,316,699 A * | 2/1982 | Schott | F03D 7/0224 | 416/139 |
| 4,335,996 A * | 6/1982 | Ross | F03D 7/0236 | 416/11 |
| 4,349,315 A * | 9/1982 | Ducker | F03D 7/0224 | 416/1 |
| 4,443,154 A * | 4/1984 | Randolph | F03D 7/0224 | 416/11 |
| 4,632,637 A * | 12/1986 | Traudt | F03D 1/0608 | 416/11 |
| 6,227,803 B1 * | 5/2001 | Shim | F03D 7/0236 | 415/122.1 |
| 7,066,709 B2 * | 6/2006 | Kim | F03D 1/0658 | 415/4.3 |
| 7,071,578 B1 * | 7/2006 | Shibata | F03D 7/0236 | 290/44 |
| 7,487,637 B2 * | 2/2009 | Buttler | F03B 17/061 | 290/42 |
| 8,678,767 B2 * | 3/2014 | Mok | F03D 1/025 | 416/142 |
| 8,753,080 B2 * | 6/2014 | Morimoto | F03D 1/0658 | 416/1 |
| 2004/0052640 A1 * | 3/2004 | Khan | F03D 7/0236 | 416/10 |
| 2010/0143131 A1 * | 6/2010 | Pitre | F03D 1/0658 | 416/85 |
| 2010/0226774 A1 * | 9/2010 | Deering | F03D 7/0204 | 416/117 |
| 2011/0211957 A1 * | 9/2011 | Folsom | F03D 1/0658 | 416/41 |
| 2015/0152844 A1 * | 6/2015 | Pitre | F03D 7/0236 | 416/1 |

* cited by examiner

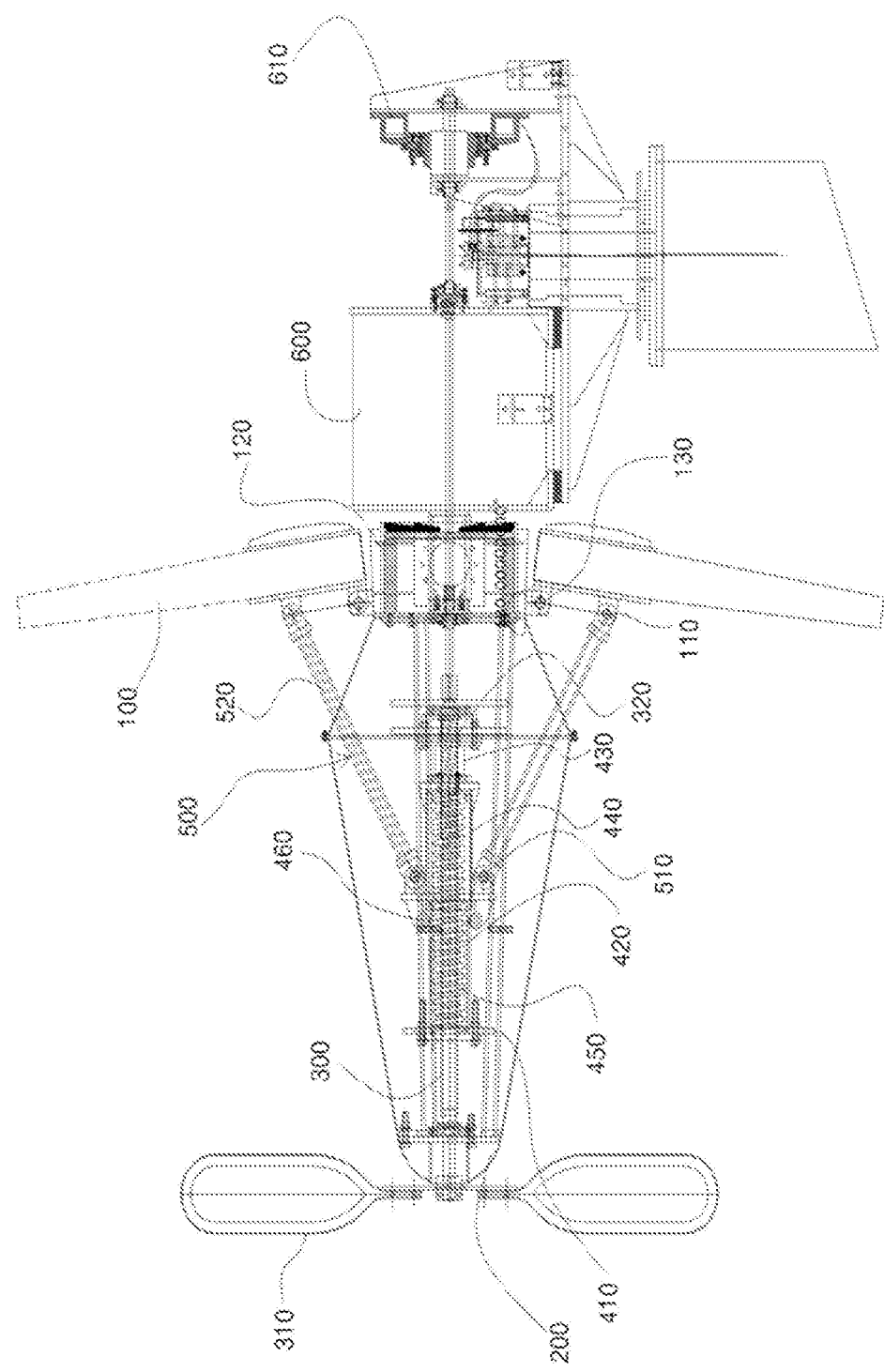
[Fig. 1]

[Fig. 2]
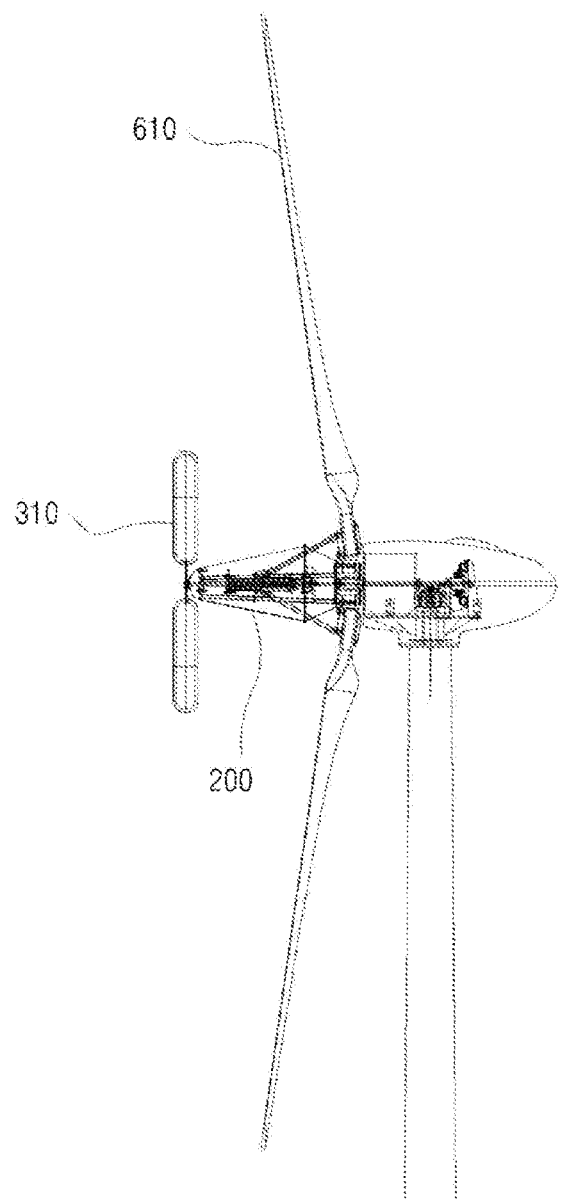

[Fig. 3]
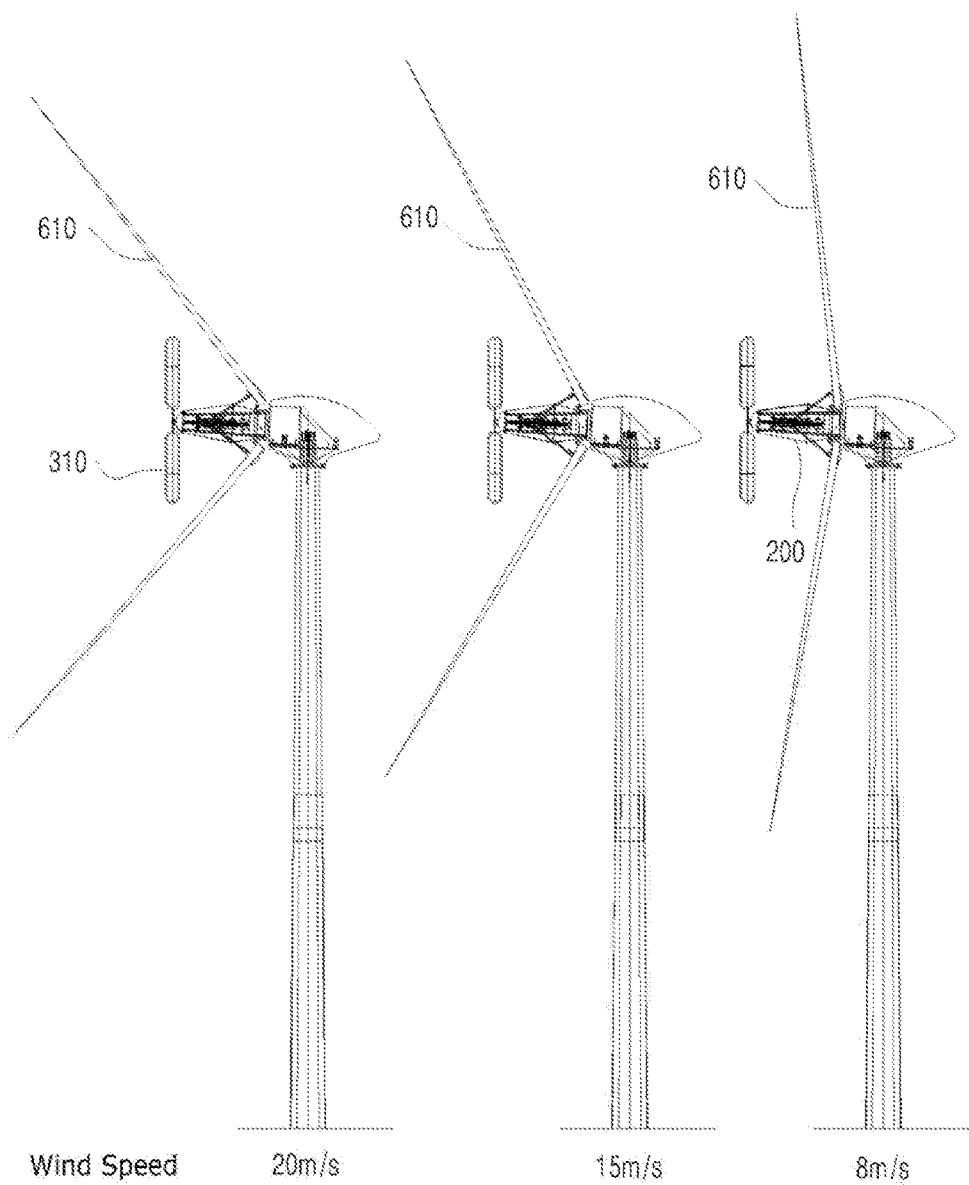

BLADE PITCH CONTROL APPARATUS FOR SMALL SIZE WIND POWER GENERATOR

TECHNICAL FIELD

The present invention relates to a blade pitch control apparatus for a small size wind power generator. More specifically, the present invention relates to a blade pitch control apparatus for a small size wind power generator configured to accomplish continuous generation by continuously maintaining the necessary rotating force of the blade by systematically operating the ball screw, spinner driver, and pitch angle controller when the rotation number of blades exceeds the reference rotation number by over wind speed, so that the blade pitch is automatically controlled.

BACKGROUND ART

In general, wind power generation refers to converting kinetic energy of wind into mechanical energy by a turbine, and converting this into electric energy. Usually, it is converted into an energy amount proportional to the cube of wind speed and area of the turbine. Wind power generators are classified into horizontal-axis type and vertical-axis type according to the direction of the rotation axis. Currently, horizontal-axis wind power generators or propeller-type wind power generators are mainly used.

Horizontal-axis wind power generators seriously affect the mechanical structure by overheating or over-rotation when a strong wind of an over wind speed exceeding the rated wind blows. In order to prevent this, when a wind of over wind speed blows, various forms of over wind speed controlling apparatuses are used to allow the rotator and nacelle to deviate from the wind direction or to decrease the rotation number of rotation wings.

Big size wind power generators allow the rotator and nacelle to deviate from the wind direction electrically by signals from the wind vane or decrease the rotation force of rotation wings by controlling the pitch of the rotation wings.

Small size wind power generators allow the rotator and nacelle to deviate from the wind direction by tail wings. In other words, they allow the direction of the rotation wings to be aerodynamically perpendicular to the wind direction by a simple constitution of fixedly installing the rear wing part at the rear end of the shaft of the rotation wing. However, such system may be damaged because vibration is continuously applied to the tail wing every time the rotator and nacelle return to its original position after avoiding the wind direction, or may allow the hinge device to be damaged.

The pitch control method mainly controls the direction of the rotation rings so that they stand obliquely with respect to the wind direction by a sensing signal provided from a wind direction/wind speed sensing part for sensing the wind direction and wind speed. However, such method is mainly applied to large size wind power generators, and has not been applied to small size wind power generators due to cost problems and limitations in installing control apparatuses.

Meanwhile, the method for controlling the output of wind power generators can be classified into a controlling part of the generator, and a controlling part indirectly supporting the output of the generator by using the shape of wings. The latter, which is a method of limiting the rotation speed of wings by using aerodynamic properties of the wings of the rotator, is classified into a stall control type and a pitch control type. In this regard, the present invention applies the pitch control technique, which is a method for controlling torque by dropping the lift applied to the blade by controlling the pitch angle of the blade, to small size wind power generators.

SUMMARY OF INVENTION

The present invention has been made to solve the above-mentioned problems, and it is an object of the present invention to provide a blade pitch control apparatus for a small size wind power generator configured to accomplish continuous generation by continuously maintaining the necessary rotating force of the blade by systematically operating the ball screw, spinner driver, and pitch angle controller when the rotation number of blades exceeds the reference rotation number by over wind speed, so that the blade pitch angle is automatically controlled.

In order to achieve the above object, the present invention is characterized by including a blade combined with an outer circumference surface of a rotator, rotating by wind; a spinner box installed and fixed in the middle of the front surface of the blade; a ball screw formed with speed control wings at one end in a state positioned in the longitudinal direction in the middle of the spinner box and having screws at the other end; a spinner driver screw-combined with the screw of the ball screw, and moving to the front and back when the rotation number of blades exceeds the reference rotation number by over wind speed or when the wind speed decreases; and a pitch angle controller connected between the spinner driver and blade, folding and unfolding the blade according to the movement direction of the spinner driver to control the pitch angle of the blade.

The spinner driver includes a spring fixing pipe fixedly installed inside the spinner box by a fixing plate, a compression pipe formed with a screw bearing, one end of the screw bearing being inserted in the outer circumference surface of the spring fixing pipe and the other end being screw-combined with the screw of the ball screw, and moving to the front and back, a compression spring placed between the compression pipe and spring fixing pipe to be compressed when the compression pipe moves forward, and a guide roller guiding the compression pipe, the guide roller being adhered to the outer circumference surface of the spring fixing pipe while being integrally formed with the body of the compression pipe and being horizontal to the ball screw when the compression pipe moves to the front and back.

The pitch angle controller is configured with a compression load controlling the pitch angle of the blade while moving along the front and back movement direction of the compression pipe, one end of the pitch angle controller being hinge-combined with the hinge piece of the compression pipe and the other end being hinge-combined with the hinge piece of the blade.

The blade is hinge-combined with the hinge piece of the rotator to rotate together with the rotator, and is folded and unfolded while controlling the pitch angle to control the pitch angle.

The present invention automatically controls the pitch angle of the blade by systematically operating the ball screw, spinner driver, and pitch angle controller when the rotation number of blades exceeds the reference rotation number by over wind speed. Thus, continuous generation may be accomplished by continuously maintaining the rotating force of the blade.

Also, the blade pitch control apparatus for a small size wind power generator according to the present invention allows normal output production even under abnormal rated wind speed because the pitch angle is automatically controlled according to the rated rotation number while the blade rotates.

Also, the pitch angle of the blade is automatically controlled during over wind speed. Thus, impact on structures such as blades, nacelles, is relieved by over wind speed, etc., and the surrounding accessories are not damaged. Accordingly, there is an effect that safety of the small size wind power generators, etc. may be guaranteed.

BRIEF DESCRIPTION OF DRAWINGS

FIG. 1 is a cross-sectional view illustrating a blade pitch control apparatus for a small size wind power generator according to the present invention;

FIG. 2 is a side view illustrating the installation state of a blade pitch control apparatus for a small size wind power generator according to the present invention; and FIG. 3 is a block diagram illustrating the state of pitch angle change of a blade by the blade pitch control apparatus for a small size wind power generator according to the present invention.

BEST MODE FOR CARRYING OUT THE INVENTION

Hereinafter, the preferable embodiments of the present invention are explained in more detail with reference to the attached drawings.

FIG. 1 is a cross-sectional view illustrating a blade pitch control apparatus for a small size wind power generator according to the present invention. FIG. 2 is a side view illustrating the installation state of a blade pitch control apparatus for a small size wind power generator according to the present invention. FIG. 3 is a block diagram illustrating the state of pitch angle change of a blade by the blade pitch control apparatus for a small size wind power generator according to the present invention.

First, the small size wind power generator used in the present invention is the same as the conventional ones in its basic constitution in that it includes a pitch control converter checking the rotation number of the blades 100 in real-time and sensing it when the rotation number of blades 100 exceeds the reference rotation number by over wind speed, an inverter converting the electric energy generated when the blade 100 rotates into the current used, a generator 600 generating electricity while rotating in the same direction and same rotation number when the blade rotates, an electronic brake 610 stopping rotation when the small size wind power generator operates abnormally, or when stop is required for a long period of time due to inspection, typhoons, etc. The drawings do not illustrate the pitch control converter, and inverter.

In more detail, the pitch control converter performs the role of operating the small size wind power generator by converting the rotation number into rpm using the frequency of the current generated while the generator 600 rotates, monitoring this and controlling the pitch angle of the blade 100.

For example, when the rated rotation number of the blade 100 is 100 rpm, it operates normally without pitch control in 100 rpm. When the rotation number of blades 100 exceeds the reference rotation number 110 rpm by over wind speed, the pitch angle is controlled by controlling the pitch control converter. When the wind speed decreases to the lowest rpm (e.g., 80 rpm) or lower, the pitch angle of the blade is restored to its original state. The basic operation and constitution of the small size wind power generator are the same as those in prior art, and thus explanation thereon will be omitted in the following.

In order to control the pitch angle of the blade more effectively, as illustrated in FIGS. 1 to 3, the small size wind power generator may be classified into a blade 100 combined with an outer circumference surface of a rotator 120, and rotating by wind; a spinner box 200 installed and fixed in the middle of the front surface of the blade 100; a ball screw 300 formed with speed control wings 310 at one end in a state positioned in the longitudinal direction in the middle of the spinner box and having screws 320 at the other end; a spinner driver 400 screw-combined with the screw 320 of the ball screw 300, and moving to the front and back when rotation number of blades 100 exceeds the reference rotation number by over wind speed or when the wind speed decreases; and a pitch angle controller 500 connected between the spinner driver 400 and blade 100, folding and unfolding the blade 100 according to the movement direction of the spinner driver 400 to control the pitch angle of the blade 100.

The spinner driver 400 includes a spring fixing pipe 420 fixedly installed inside the spinner box 200 by a fixing plate 410; a compression pipe 440 formed with a screw bearing 430, one end of the screw bearing being inserted in the outer circumference surface of the spring fixing pipe 420 and the other end being screw-combined with the screw 320 of the ball screw 300, and moving to the front and back; a compression spring 450 placed between the compression pipe 440 and spring fixing pipe 420 to be compressed when the compression pipe 440 moves forward; and a guide roller 460 guiding the compression pipe 440, the guide roller being adhered to the outer circumference surface of the spring fixing pipe 420 while being integrally formed with the body of the compression pipe 440 and being horizontal to the ball screw 300 when the compression pipe 440 moves to the front and back.

The pitch angle controller 500 is configured with a compression load 520 controlling the pitch angle of the blade 100 while moving along the front and back movement direction of the compression pipe 440, one end of the pitch angle controller being hinge-combined with the hinge piece 510 of the compression pipe and the other end being hinge-combined with the hinge piece 110 of the blade.

As such, in order to control the pitch angle while the blade 100 is folded or unfolded to the front and back by the pitch angle controller 500, spinner driver 400 and ball screw 300, the blade 100 and rotator 120 are manufactured to be separated, and after being manufactured to be separated, the blade 100 is hinge-combined with the hinge piece 130 of the rotator to rotate together with the rotator 120, and is folded and unfolded while controlling the pitch angle to control the pitch angle.

The present invention configured as above allows the speed controlling wing 310 and ball screw 300 to rotate, enabling continuous fixed speed driving when over wind speed occurs at the blade 100 side, and since the screw 320 of the ball screw 300 and the screw bearing 430 of the spinner driver 400 are screw-combined with each other, the screw bearing 430 and compressor pipe 440 are configured to move forward along the ball screw 300, and while moving forward, the compression spring 450 is compressed between the spring fixing pipe 420 and the compression pipe 440. In this case, the compression pipe 440 as above guides the compression pipe 440 by allowing the guide roller 460 to be adhered to the outer circumference surface of the spring fixing pipe 420, and thus the compression pipe 440 can move forward while being horizontal to the ball screw 300.

Meanwhile, when the compression pipe 440 moves forward along the ball screw 300, the pitch angle is controlled by allowing the blade 100 to be folded by the pitch angle controller 500. More specifically, one end of the compression load 520 of the pitch angle controller 500 is hinge-combined with the hinge piece 510 of the compression pipe and the other end is hinge-combined with the hinge piece 110 of the blade. Thus, when the compression pipe 440 moves forward, the compression load 520 pulls the blade 100 during the process of moving forward along the compression pipe 440, and since the pulled blade 100 is hinge-combined with the hinge piece 130 of the rotator, it is folded, thereby controlling the pitch angle.

When the wind speed decreases in this state, the spinner driver 400 moves backward by the restoring force of the compression spring 450 compressed between the compression pipe 440 and the spring fixing pipe 420, and during the process of moving backwards, the blade 100 is unfolded and returns to its original position.

What is claimed is:

1. A blade pitch control apparatus for a small size wind power generator, comprising:
    a blade combined with an outer circumference surface of a rotator, rotating by wind;
    a spinner box installed and fixed in the middle of the front surface of the blade;
    a ball screw formed with speed control wings at one end in a state positioned in the longitudinal direction in the middle of the spinner box and having screws at the other end;
    a spinner driver screw-combined with the screw of the ball screw, and moving to the front and back when a rotation number of the blade exceeds a reference rotation number by over wind speed or when wind speed decreases; and
    a pitch angle controller connected between the spinner driver and blade, folding and unfolding the blade according to the movement direction of the spinner driver to control pitch angle of the blade.

2. The apparatus of claim 1, wherein the spinner driver comprises: a spring fixing pipe fixedly installed inside the spinner box by a fixing plate, a compression pipe formed with a screw bearing, one end of the screw bearing being inserted in the outer circumference surface of the spring fixing pipe and the other end being screw-combined with the screw of the ball screw, and moving to the front and back; a compression spring placed between the compression pipe and spring fixing pipe to be compressed when the compression pipe moves forward; and a guide roller guiding the compression pipe, the guide roller being adhered to the outer circumference surface of the spring fixing pipe while being integrally formed with the body of the compression pipe and being horizontal to the ball screw when the compression pipe moves to the front and back.

3. The apparatus of claim 1, wherein the pitch angle controller is configured with a compression load controlling the pitch angle of the blade while moving along the front and back movement direction of a compression pipe, one end of the pitch angle controller being hinge-combined with a hinge piece of the compression pipe and the other end being hinge-combined with a hinge piece of the blade.

4. The apparatus of claim 1, wherein the blade is hinge-combined with a hinge piece of the rotator to rotate together with the rotator, and is folded and unfolded while controlling the pitch angle to control the pitch angle.

* * * * *